United States Patent [19]

Lundstrom et al.

[11] Patent Number: 4,995,501

[45] Date of Patent: Feb. 26, 1991

[54] TRANSPORT SYSTEM AND METHOD FOR EMBOSSING APPARATUS

[75] Inventors: Robert W. Lundstrom, Plymouth; Benjamin H. Sannel, St. Louis Park; Dennis J. Warwick, Richfield, all of Minn.

[73] Assignee: DataCard Corporation, Minneapolis, Minn.

[21] Appl. No.: 276,233

[22] Filed: Nov. 23, 1988

[51] Int. Cl.[5] .............................................. B65G 49/00

[52] U.S. Cl. ................................ 198/341; 198/468.2; 271/268; 294/104; 414/226; 400/134

[58] Field of Search ............... 400/134, 129, 130, 131, 400/132, 134.3; 101/18, 2, 216, 228; 271/85, 268, 129; 414/225, 226; 294/104; 198/468.9, 468.2, 341

[56] References Cited

U.S. PATENT DOCUMENTS

| | | | |
|---|---|---|---|
| 2,055,051 | 9/1936 | Sandt . | |
| 3,124,064 | 3/1964 | Schick . | |
| 3,563,175 | 2/1971 | Torresen | 101/408 X |
| 3,669,014 | 6/1972 | Spaw et al. . | |
| 3,995,545 | 12/1976 | Romeo et al. | 101/2 X |
| 4,057,011 | 11/1977 | Tramposch et al. . | |
| 4,091,910 | 5/1978 | Bolton et al. . | |
| 4,180,338 | 12/1979 | LaManna et al. . | |
| 4,284,301 | 8/1981 | Geiger et al. | 271/268 X |
| 4,384,711 | 5/1983 | Gabel et al. . | |
| 4,449,450 | 5/1984 | Barny et al. | 101/216 X |
| 4,519,600 | 5/1985 | Warwick et al. . | |

*Primary Examiner*—Clifford D. Crowder

*Attorney, Agent, or Firm*—Merchant, Gould, Smith, Edell, Welter & Schmidt

[57] ABSTRACT

A card transport apparatus (12) carries cards along a card transport path through card processing stations (14, 74, 76). The transport apparatus (14) includes a vertically adjustable card carriage (16) for retaining cards along a card transport path throughout the entire card processing operation through the card processing stations (14, 74, 76). The card carriage (16) grips the cards with independently pivoting gripping arms (52, 54), actuated open by push solenoids (18, 20, 22) for picking up and releasing cards.

25 Claims, 6 Drawing Sheets

TRANSPORT SYSTEM AND METHOD FOR EMBOSSING APPARATUS

BACKGROUND OF THE INVENTION

The present invention relates to a transport system and method for transporting plastic cards along a card transport path for processing. In particular, the present invention relates to transporting cards through a card embossing and topping system.

Earlier methods of transporting a card do not transport a card fully across all processing stations and do not provide for flexibility in processing station arrangements. U.S. Pat. 4,088,216 and 4,180,338 to LaManna et al. are representative of the prior card transport art. In the prior art, relatively large linkages were required at both ends of the transport mechanism for adjusting the height of the card transport rail for moving the card to various processing stations. As best shown in FIG. 3 of U.S. Pat. 4,088,216, the card transport system requires a large linkage at each end of a card rail. The linkages have a large number of parts which require constant adjustment for keeping the system aligned. The prior art does not provide for carrying cards across the entire length of the transport path and requires dummy mechanisms at processing stations to transport a card along portions of the transport path if some processing mechanisms are not being used in a particular processing operation. The dummy mechanisms comprise an individual processing mechanism transport without a card processing mechanism. The processing mechanism transport requires space, needs extra maintenance for proper operation, and adds cost.

As is shown in FIGS. 7A–7E of U.S. Pat. 4,088,216, the prior art uses a single pivoting arm, pivoting about a single axis, in the card carriage having grippers at the lateral ends of the carriage. With the prior art carriage, precise adjustments are required so that both grippers apply equal force against the card. If a jam occurs, one of the grippers may easily become bent or misadjusted. Additional cards may then be dropped or improperly aligned since the bent arm is not able to properly grip or retain the card. The card processing must be stopped and the arm or carriage replaced. This causes undue delays and costly down time. The prior art carriages do not allow the flexibility in holding the card that is required if a jam occurs during the transport process.

It is apparent that an improved apparatus for transporting cards through processing stations along a card transport path is needed. The present invention solves problems associated with rapidly transporting cards along the transport path.

SUMMARY OF THE INVENTION

The present invention relates to a transport apparatus for moving cards along a transport path. In particular, the present invention relates to transporting plastic cards through an embossing system along the card transport path. The present invention has a transport function similar to that disclosed in U.S. Pat. No. 4,519,600 to Warwick et al. and assigned to DataCard Corporation, incorporated herein by reference.

According to the present invention, cards are input by hand or by an input hopper at an end of the card transport path. A card carriage having pivoting arms which close grippers onto a card for retention and riding on a transport rail is moved to its input position at the end of the transport path and the arms are pivoted open for receiving a card. The carriage is lowered onto the card with the grippers open. A spring projecting downward from the carriage presses the top of the card down, forcing the card down against a lower stop. The stop aligns the card parallel to the transport rail so that the card is properly aligned for gripping. The carriage is then raised so the lower springs do not engage the top of the card. The grippers are then closed on the aligned card. The grippers are mounted on pivoting arms on the card carriage and compression springs force the arms to pivot so that the grippers close onto the card. To open the card grippers, solenoid push bumpers press an upper portion of the pivoting arms, thereby pivoting the bottom portion of the arm open for receiving the card. The solenoid bumpers then release the upper portion so that the compression springs pivot the lower portion of the arm to a closed position onto the card.

A second embodiment of the carriage includes a single pivoting arm pivoting universally about a pin equally spaced from the grippers. In this arrangement, should a gripper become bent or misadjusted, the arm is able to pivot so that even pressure is applied at both gripping points so that the card is properly retained.

Stepper motors drive the card carriage across the transport rail spanning the entire length of the card transport path. A cable and pulley drive system provides the motion for the card carriage. The transport rail moves up and down a vertical post driven by a second stepper motor. The distance of the carriage along the transport path is not measured, but determined in both the horizontal and vertical position by the number of steps moved by each of the stepper motors. In operation, the transport carriage is moved to its home position before picking up each card. The transport then moves to the desired location as the stepper motor advances the necessary number of steps in both the horizontal and vertical direction to obtain the proper position. The carriage does not actually measure how far along the path it has traveled, only the number of steps moved by the stepper motor is detected. Sensing at various locations along the transport path ensures that the card is in the proper position and that no slipping or jamming has taken place.

Stops along the transport path are programmably controlled by an interface to the card transport system. As well as programming the original stops for processing the cards, adjustments may be made if the mechanism becomes misaligned. Changes may also be programmed to add stops or to ignore stops that are not required. The card carriage retains the card across the entire transport path and does not release the card at individual processing stations. Therefore, the processing mechanisms do not transport the cards, providing for greater flexibility in processing mechanism configuration.

When the card has been transported across the entire transport path, the pivoting arms on the card carriage are opened to release the card. A solenoid at the end of the path pushes the upper portion of the arm, pivoting the grippers open, releasing the card. Feed rollers then deliver the card to an output hopper; if the system does not have output hoppers, a pusher bar mounted on the card carriage is used to move the card an additional distance. When the pusher bar is used, the card carriage is lifted, reversed, and lowered, thereby positioning the card carriage adjacent the trailing edge of the card. The card carriage is then advanced, pushing the card to an output position.

The transport rail is configured to span the entire length of the transport path, but the carriage may pick the card up at any position along the path. If a.magnetic stripe is being encoded on the card, the encoding mechanism will move the card a portion of the distance down the transport path. When the encoding operation is complete, the card is picked up by actuating a solenoid positioned at the end of the magnetic encoding mechanism to open the grippers. The card is then transported down the path for additional processing operations in the same manner as if an encoding mechanism is not implemented.

In one embodiment, the card carriage comprises two arms, each arm independently pivoting and each capable of independently gripping a card. Two pivoting arms allow greater flexibility in the card grip so that if a card jam occurs or the card is bent and one arm pivots open, the second arm remains closed and the second arm gripper continues holding the card. The two arms allow one arm to be accidentally pivoted open as may occur in a jam. The other arm remains closed and gripping the card. Unlike prior systems having a single arm pivoting about one axis, the opening of one gripper does not cause the arm to bend or twist if the second gripper is forced closed.

In a second embodiment of the card carriage, the carriage comprises a single pivoting arm having grippers at each side of the arm. The arm pivots about a single pin and is biased to a closed position by a compression spring at the end of the arm opposite the grippers. The arm pivots about a single universal pivot pin located between the gripper pair and between the spring and a line between the grippers. In this arrangement, the spring is pushed inward to open the arm, thereby pivoting about a first axis parallel to the grippers. The arm also pivots about a second axis so that only one gripper opens. It can be appreciated that if a card is bent or a card jam occurs, so that one gripper is pivoted open, the second gripper remains closed and the card is still gripped by the second gripper. The arm contacts at three points—the two grippers and the pivot pin centered between the grippers, so that even pressure is applied to the card at both grippers. With universal pivoting about a single pin, the pivoting arm is not as likely to be bent during a jam as with an arm pivoting about a single axis. The arm flexibility requires less down time and replacement of parts.

These and various other advantages and features of novelty which characterize the invention are pointed out with particularity in the claims annexed hereto and forming a part hereof. However, for a better understanding of the invention, its advantages, objects obtained by its use, reference should be made to the drawings that form a further part hereof, and to the accompanying descriptive manner, in which there is illustrated and described preferred embodiments of the invention.

BRIEF DESCRIPTION OF THE DRAWINGS

In the drawings wherein like reference numerals and letters indicate corresponding elements throughout the several views.

DETAILED DESCRIPTION OF THE DRAWINGS

Figure 1:
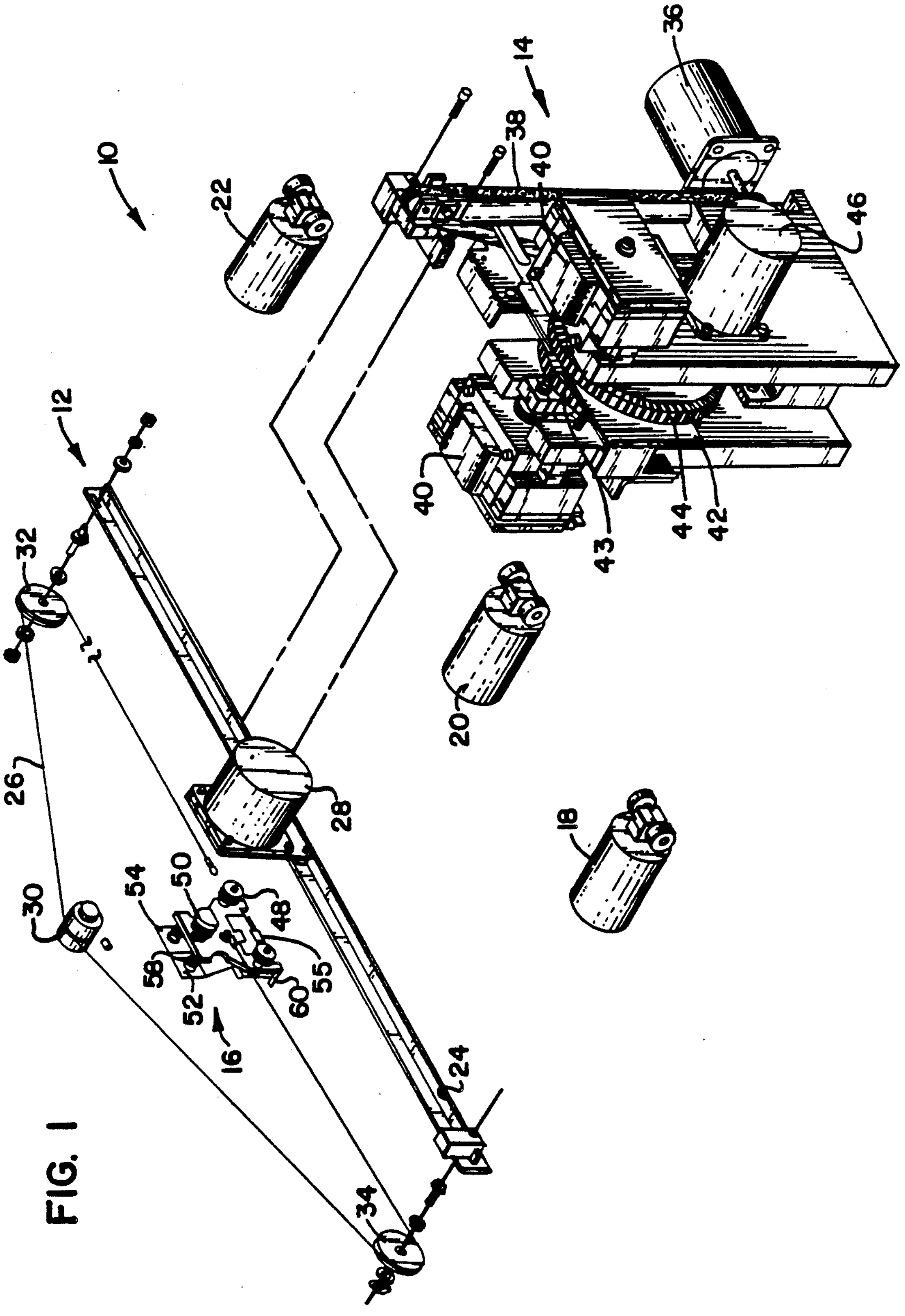
FIG. 1 is a partially exploded view of a card transport apparatus and embossing mechanism in accordance with the principles of the present invention.
Figure 2:
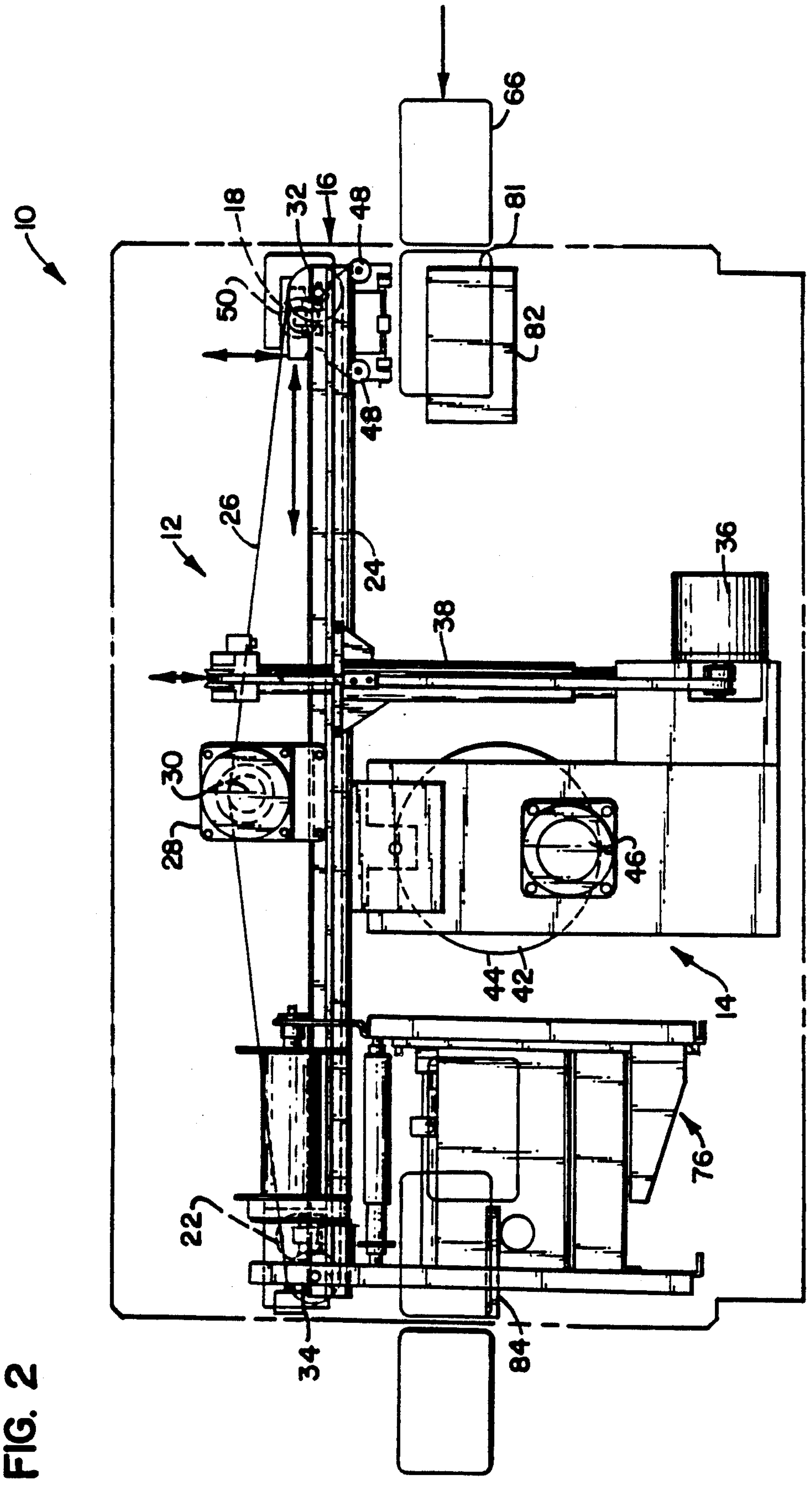
FIG. 2 is an elevational view illustrating a card processing system implementing the card transport apparatus shown in FIG. 1.

In FIG. 1 portions of card processing system 10 are shown including a card transport apparatus 12 and a card embossing mechanism 14. FIG. 2 shows the card processing system 10 including the card embossing mechanism 14 and a foil topping mechanism 76.

The card transport apparatus 12 comprises a card carriage 16 guided along a carriage rail 24 for movement along a card processing transport path. Card pickup and release positions are defined by solenoid bumpers at 18, 20, and 22. A horizontal stepper motor 28, which is programmably controlled, drives cable 26 around pulleys 30, 32, and 34 providing motion for the carriage 16 along the carriage rail 24. A programmably controlled vertical lift motor 36 moves the carriage rail 24 and therefore the card carriage 16 up and down providing vertical freedom along the transport path. A vertical support shaft 38 supports the motor 36 and the carriage rail 24.

Solenoids 40 engage embossing wheel 42 for driving punches and dies against the card surface for imprinting raised letters on plastic cards. The embossing wheel 42 is rotatably driven by embossing motor 46 for rotating to the correct character punch and die on the embossing wheel punch side 43 and die side 44 for imprinting.

Figure 3:
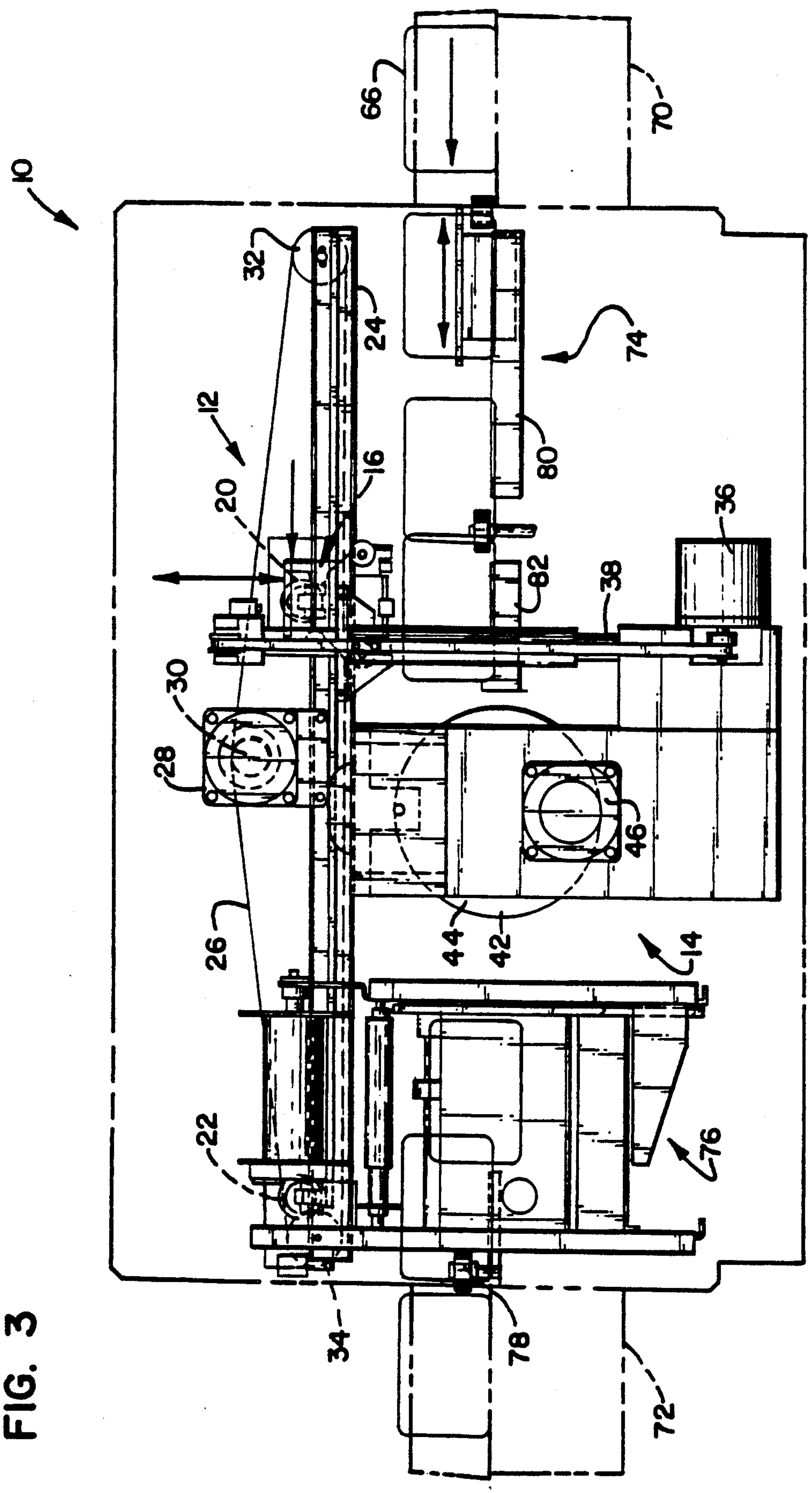
FIG. 3 is an elevational view of an embodiment of a card embossing system having an input hopper, output hopper and a magnetic encoding mechanism, and implementing the card transport apparatus shown in FIG. 1.
Figure 4:
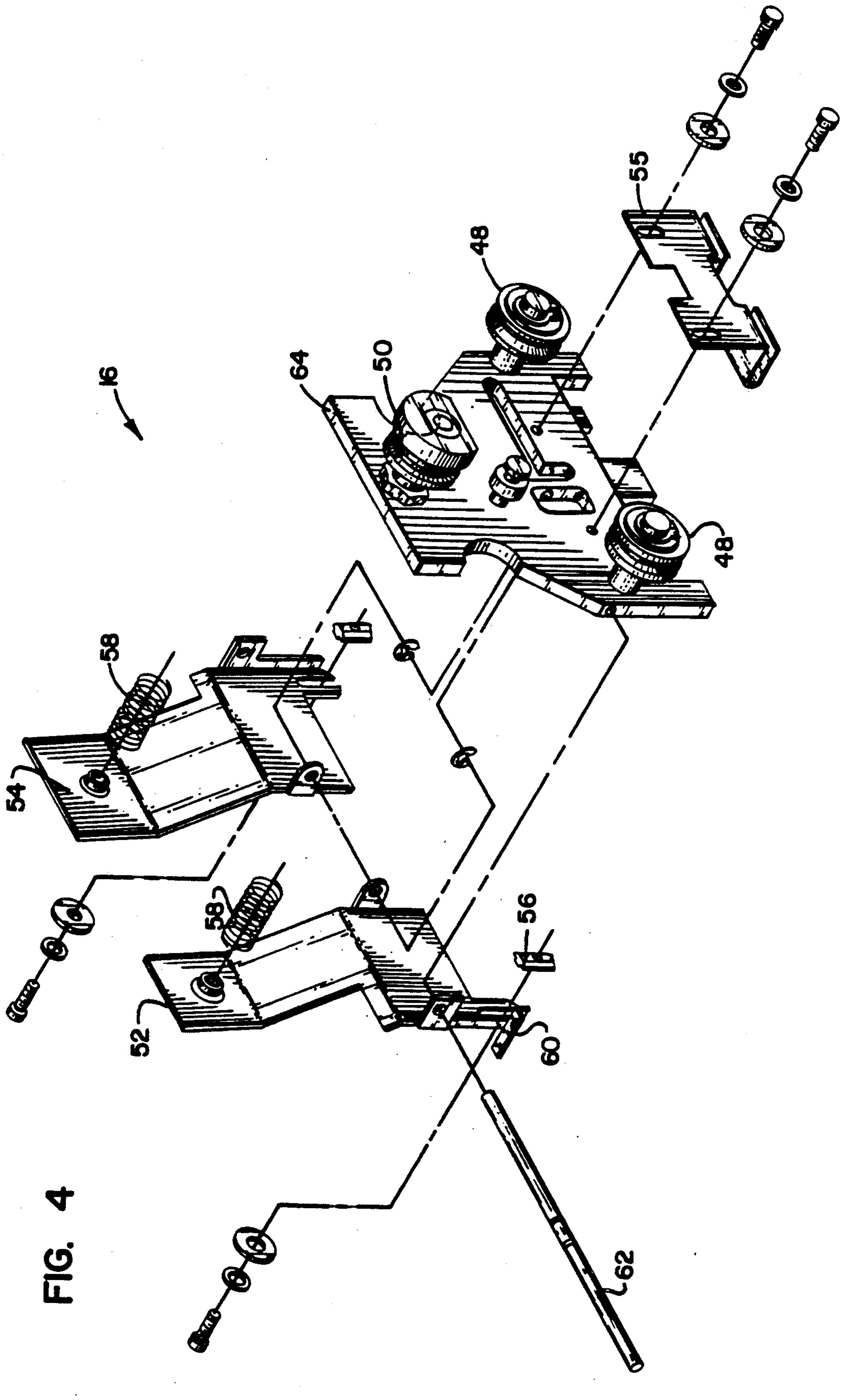
FIG. 4 is an exploded view of the card carriage of the card transport apparatus shown in FIG. 1.

The card carriage 16 rides the carriage rail 24 on lower rollers 48 and an upper roller 50 positioned above and below the carriage rail 24 insuring proper tracking. The card carriage 16 moves through processing stations as shown in FIGS. 2 and 3 such as the embossing mechanism 14, the magnetic encoding mechanism 74, and the foil topping mechanism 76. The card 66 may be input and output manually as shown in FIG. 2 or by an input hopper 70 and/or output hopper 72 as shown in FIG. 3. The card carriage 16 carries the card 66 along the transport path in proper position for carrying on the various card printing and embossing processes. As shown in FIG. 2, cards are manually input into the card processing system until engaging a card stop 82 and is held by support 81. The card carriage 16 is then moved to the end of the carriage rail 24 and is actuated to grip the card 66. The carriage 16 then moves the card 66 along the card transport path stopping at the various card processing stations until reaching an end of the card transport path. The card is then released and falls onto an output support 84. The card carriage 16 is then raised, reversed, lowered, and then pushed forward to output the card.

As shown in FIG. 3, various other modifications can be made to the card embossing system 10 to change the card transport operation. A card embossing system 10 includes an input hopper 70 automatically feeding cards into the card embossing system 10. The card processing may also include the encoding of a magnetic stripe onto the cards. When a magnetic encoding mechanism 74 is included, cards are either input from an input hopper 70 or manually input as shown in FIG. 2. The magnetic stripe encoding mechanism 74 carries the card 66 across rail 80 of the mechanism 74 before being picked up by the card carriage 16. The carriage rail 24 in this embodiment spans the entire length of the card transport path, but the card is picked up at the exit end of the encoding mechanism 74 and not at the end of the card carriage rail 24. It can be appreciated that with this arrangement, the card transport apparatus 12 does not have to be substantially reconfigured for use with an embossing system having an encoding mechanism 74. The same rail configuration is used with only a change in position of a solenoid push bumper to 20 and card stop 82 for picking up the cards and reprogramming to stop the carriage 16 at the required card pick up position. In both embodiments, the card carriage 16 carries the card 66 through the remaining card processing operations and does not release the card 66 until reaching the exit end of the card transport path. As shown in FIG. 3, the cards are dropped from the carriage 16 and gripped by output rollers 78 which advance the card 66 to an output hopper 72 where the cards are stacked and sorted.

Figure 6:
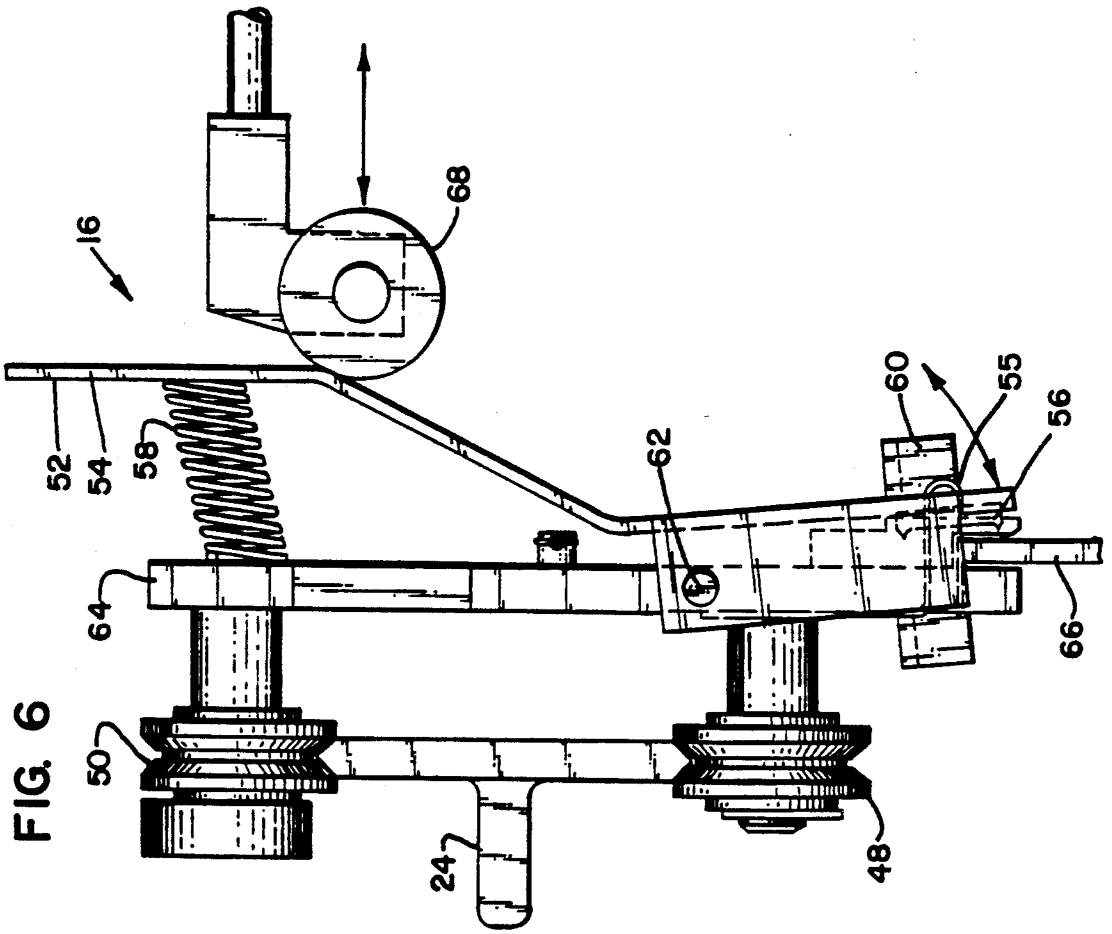
FIG. 6 is a side view of the card carriage shown in FIG. 4 in an open position.
Figure 5:
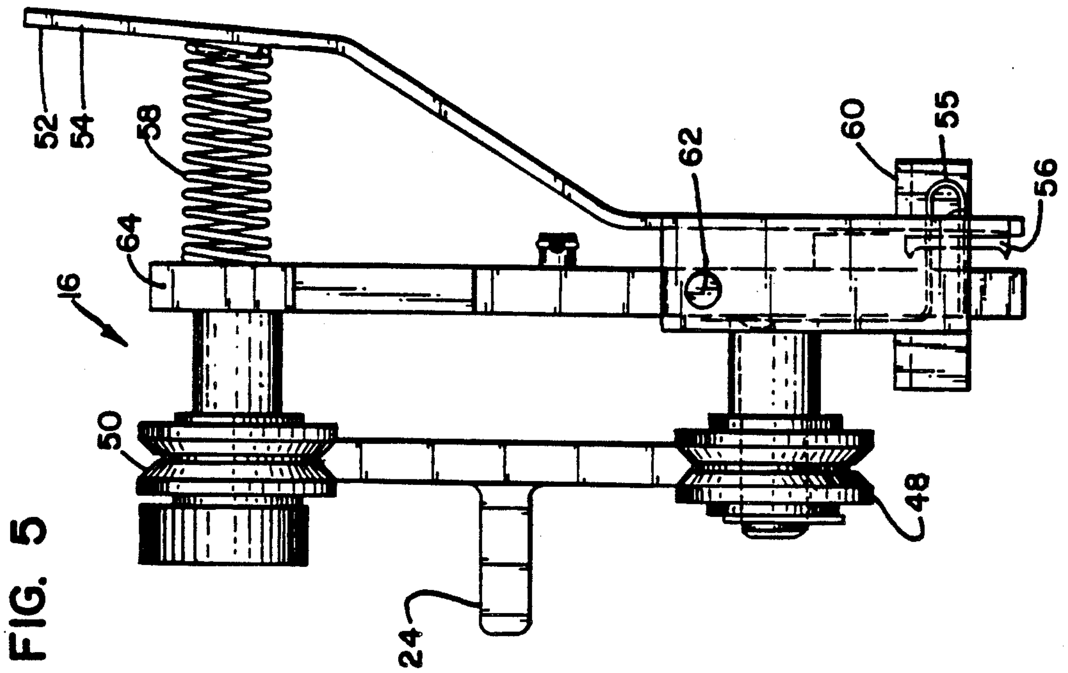
FIG. 5 is a side view of the card carriage shown in FIG. 4 in a closed position.

As shown in FIGS. 5 and 6, one embodiment of the card carriage 16 comprises pivot arms 52 and 54 including grippers 56 mounted thereon. The pivot arms 54 pivot around an axle 62 against a carriage base plate 64. The grippers 56 are biased in a closed position by associated springs 58 maintaining the pivoting arms 52 and 54 in a closed position for gripping the card 66. The arms 52 and 54 are pivoted open by means of a solenoid bumper head 68 engaging both arms for pivoting the arms to an open position wherein cards are picked up or released.

In operation, the arms 52 and 54 are pivoted open by actuating a solenoid so that a bumper head 68 engages arms 52 and 54. The carriage moves down so that positioning springs 55 engage the top of card 66 as shown in FIG. 6. The positioning springs 55 push the card 66 down against stop 82. As shown in FIGS. 2 and 3, the stop 82 is aligned parallel to rail 24 so that when card 66 is pressed against stop 82, the card 66 is straightened for gripping. The carriage 16 is then raised so that springs 55 are not engaging card 66. The arms 52 and 54 then pivot closed onto the aligned card 66. For releasing cards, the card carriage 16 is moved to a position for releasing the card 66 and the arms 52 and 54 are engaged by a bumper head 68 and pivoted open. The card 66 drops from the card carriage 16, the carriage 16 is raised above the card and the pivot arms 52 and 54 are pivoted back to a closed position. In some embodiments, an output hopper 72 feeds the card from the transport path as shown in FIG. 3. The card carriage 16 includes a card outputting pusher bar 60 for pushing the cards 66 out from the card processing system 10 when an output hopper 72 is not used, as shown in FIG. 2. When an output hopper is not used, after the carriage 16 is raised above the card, the carriage 16 is backed and lowered behind the card 66. The carriage 16 is then moved forward so that pusher bar 60 engages the trailing edge of the card and pushes the card 66 out of the card processing system.

It can be appreciated that with two arms 52 and 54, if a jam occurs and one arm is pivoted open, the other remains closed, gripping the card 66. During a jam, if pressure is applied in different directions to each of arms 52 and 54, the arms 52 and 54 are not as likely to be bent as occurs when differing pressures are applied to the same arm as in prior carriages. After time, misalignment of single arm carriages may cause one gripper to not engage, even when closed. This problem is avoided with dual pivoting arms 52 and 54.

Figure 7:
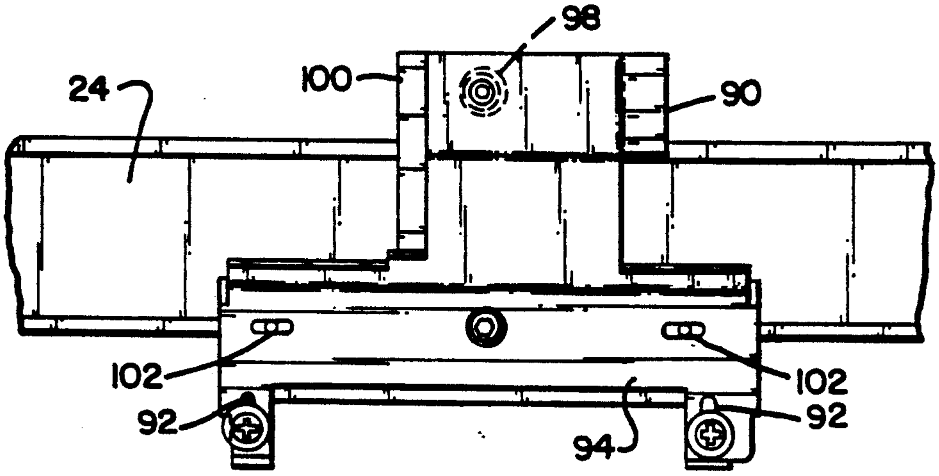
FIG. 7 is an elevational view of a second embodiment of a card carriage according to the principles of the present invention.
Figure 8:
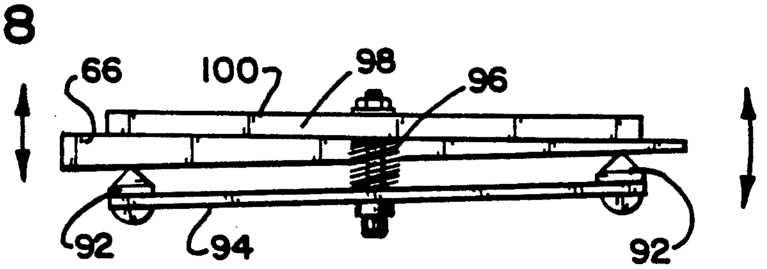
FIG. 8 is a bottom plan view of the card carriage shown in FIG. 7 gripping a card having an exaggerated uneven thickness.
Figure 9:
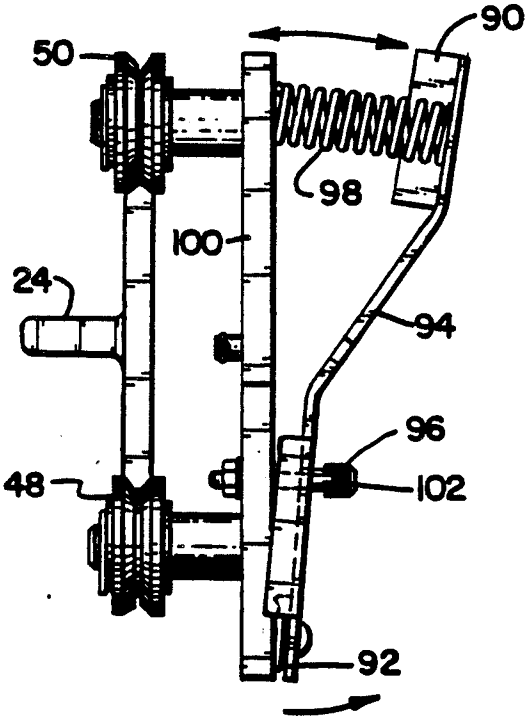
FIG. 9 is a side view of the card carriage shown in FIG. 7.

A second embodiment of the card carriage 90 is shown in FIGS. 7–9. The carriage comprises grippers 92 mounted on a single pivoting arm 94. The arm 94 pivots about a center pivot pin 96 spaced equally from grippers 92 and biased to a closed position by a compression spring 98 pushing against a backing plate 100. The arm 94 pivots about a first axis wherein both grippers 92 pivot open in a manner as shown in FIG. 9. The arm 94 also pivots about a second axis perpendicular to the first axis about the pivot pin 96, as shown in FIG. 8. Tabs 102 at ends of the arm 94 prevent the arm 94 from excess movement and maintain alignment. It can be appreciated that pivoting about a second axis allows the arm 94 to open a gripper 92 at one end of the arm 94 while the second gripper 92 remains closed. If a card is bent or a card jam occurs, the arm 94 pivots in response to the jam so that one of the grippers 92 retains the card. The pin 96 and grippers 92 are the only points of contact, so that the spring 98 biases the arm so that even pressure is applied at both grippers 92, even if the card is bent or has an uneven thickness, as shown in exaggeration in FIG. 8. The universal pivoting about pin 96 allows the arm 94 to pivot back at one side if a jam occurs. The arm 94 is less likely to become bent and require replacement as an arm pivoting about a single axis wherein both grippers open when the arm is pivoted.

It is to be understood that even though the above numerous characteristics of the invention have been set forth in the foregoing description, together with details of the structure of the function of the invention, disclosure is illustrative only, changes may be made in detail, especially matters of shape, size and arrangement of parts within the principles of the invention, to the full extent by the broad, general meaning of the terms in which the independent claims are expressed.

What is claimed is:

1. A card handling and transport system for transporting cards from an input to an output along a card transport path extending from the input to the output, comprising:

a plurality of spaced apart locations defined along the card transport path having card processing stations associated with the spaced apart locations placed along the card transport path, wherein the card processing station performs processing operations on plastic cards at the spaced apart locations, the card processing stations being removable for varying the card processing without changing the card transport path;

card transporting means for carrying the card along the card transport path through the card processing stations, the card transporting means comprising card retaining means for retaining the card continuously while transporting the card along the card transport path, and motive means for advancing the card retaining means along the card transport path, wherein the card retaining means comprises a card carriage having a plurality of card grippers, each card gripper mounted on an associated pivoting arm, each arm being positioned by an associated compression spring biasing the arm toward a closed position for pressing the gripper against a card and pushing the card against a backing plate, thereby securing the card; and programmable control means for positioning the card transporting means and for stopping the retained cards at selected locations for performing selected processing operations, the selected locations corresponding to the associated card processing stations.

2. An apparatus according to claim 1, wherein the card transporting means adjust vertically for rising and falling along the corresponding card transport path.

3. An apparatus according to claim 1, wherein the pivoting arms pivot about a center axis, the compression spring pressing an upper end of the arm away from the backing plate, thereby pivoting a lower end of the arm having grippers thereon against the backing plate.

4. An apparatus according to claim 1, including card opening means comprising a push solenoid, a plunger of the solenoid engaging the upper end of the pivoting arms for pivoting open the grippers.

5. An apparatus according to claim 1, wherein the card carriage includes push springs at the lower end of the carriage for engaging a top edge of the card for positioning the card relative to the carriage for carrying along the transport path.

6. An apparatus according to claim 1, wherein an arm is pivoted open by pushing the non gripper end in by push solenoids, the solenoids are placed along the card transport path at selected card pickup and release locations.

7. An apparatus according to claim 1, the card transporting means including output means, comprising a push bar extending beyond a leading edge of the carriage for pushing released cards beyond an end of the card transport path.

8. An apparatus according to claim 1, wherein the motive means comprise a stepper motor.

9. An apparatus according to claim 8, wherein position of the card is calculated by counting the number of steps moved by stepper motor powering the card transport means.

10. An apparatus according to claim 1, wherein the card transporting means comprises a rail traversing the entire length of the card transport path.

11. An apparatus according to claim 10, wherein a card pick up position is variably located along the card transport path.

12. An apparatus according to claim 11, wherein the correct position of the card is sensed by photocells at various sensing locations along the card transport path.

13. An apparatus according to claim 1, wherein the card transporting means is cable driven along the card transport path.

14. An apparatus according to claim 1, wherein the card transporting means is returned to a home position and wherein the position is sensed before moving along the card transport path.

15. A carriage transport apparatus for carrying plastic cards to card processing stations along a card processing transport path comprising:

a card carriage having a plurality of pivoting arms, each arm having a gripper affixed at one end of the arm for closing onto a card and holding the card against a back plate and card closing means associated with each arm for biasing the arms to a closed position for retaining the cards;

card rail means extending across the entire length of the card processing transport path for supporting the card carriage;

card carriage motive means for moving the carriage apparatus along the card processing transport path; and arm opening means for pivoting the arms into an open position for picking up and releasing cards.

16. An apparatus according to claim 15, including output push means attached to the carriage for urging a card beyond an end of the card processing transport path, after a card has been released from the card carriage.

17. An apparatus according to claim 15, wherein arm opening means comprise push solenoids positioned at locations along the card transport path whereat cards are picked up or released, and wherein the grippers are pivoted open by the push solenoids for picking up or releasing a card.

18. An apparatus according to claim 15, wherein the pivoting arms are biased to a closed position by compression springs, each pivoting arm having an associated compression spring pivoting the corresponding arm to a closed position.

19. A method of transporting cards along a card processing transport path in a card carriage riding a transport rail having pivoting arms with grippers thereon biased to a closed position by compressing springs, the carriage further including positioning springs extending downward from the carriage and card push means extending beyond the leading edge of the carriage, comprising the steps of:

positioning the card carriage above the card;

lowering the carriage so that the positioning springs engage the top of the card and press it against a card stop, the card stop being parallel to the card rail, so that the card is properly aligned;

raising the carriage slightly to a gripping position so that the positioning springs do not engage the card;

pivoting the arms closed, thereby gripping the card;

moving the carriage and gripped card along a transport path and through card processing stations;

continuously retaining the card while stopping for processing at the card processing stations;

releasing the card at an end of the card transport path;

lowering the carriage to a position behind a trailing edge of the card; and pushing the card to a card output.

20. A method according to claim 19, wherein the step of pivoting the arms open uses a push solenoid for engaging the non-gripper end of the pivoting arms to pivot open the pivoting arms.

21. A method according to claim 19, wherein cards are released by a push solenoid engaging the non gripper end of the pivoting arms thereby pivoting the arms open and releasing the gripping means from the card.

22. A method according to claim 19, wherein the card is sensed at various processing locations along the transport path and detection means determine whether the card is properly positioned, wherein the card is delivered straight through the remaining portion of the card transport path without further processing if it is detected that a card processing mistake has occurred and the card is rejected.

23. A method according to claim 19, wherein the card transport system transports cards across card processing positions whether the card processing stations are in position or removed.

24. A carriage for carrying a card, the carriage riding on a card rail, comprising:

a back plate;

a plurality of arms pivoting relative to the back plate about an intermediate point;

associated gripping means on each arm for gripping a card between the arm and the back plate;

associated biasing means for biasing the pivoting arms to a closed gripping position;

card positioning means extending downward for engaging a top edge of a card and aligning the card prior to gripping; and, card push means extending beyond a leading end of the carriage for engaging a trailing edge of a card and pushing the card beyond the end of the card rail.

25. An apparatus according to claim 24, wherein the positioning means comprise push springs.

* * * * *

UNITED STATES PATENT AND TRADEMARK OFFICE
CERTIFICATE OF CORRECTION

PATENT NO. : 4,995,501

DATED : February 26, 1991

INVENTOR(S) : Lundstrom et al.

It is certified that error appears in the above-identified patent and that said Letters Patent is hereby corrected as shown below:

Column 3, line 5,
DELETE "." after --If a--

Column 3, line 63,
INSERT --,-- after "drawings"

Column 4, line 25,
INSERT --,-- after "1"

Column 4, line 25,
INSERT --a-- after "of"

Signed and Sealed this

Fifteenth Day of December, 1992

*Attest:*

DOUGLAS B. COMER

*Attesting Officer*

*Acting Commissioner of Patents and Trademarks*